UNITED STATES PATENT OFFICE.

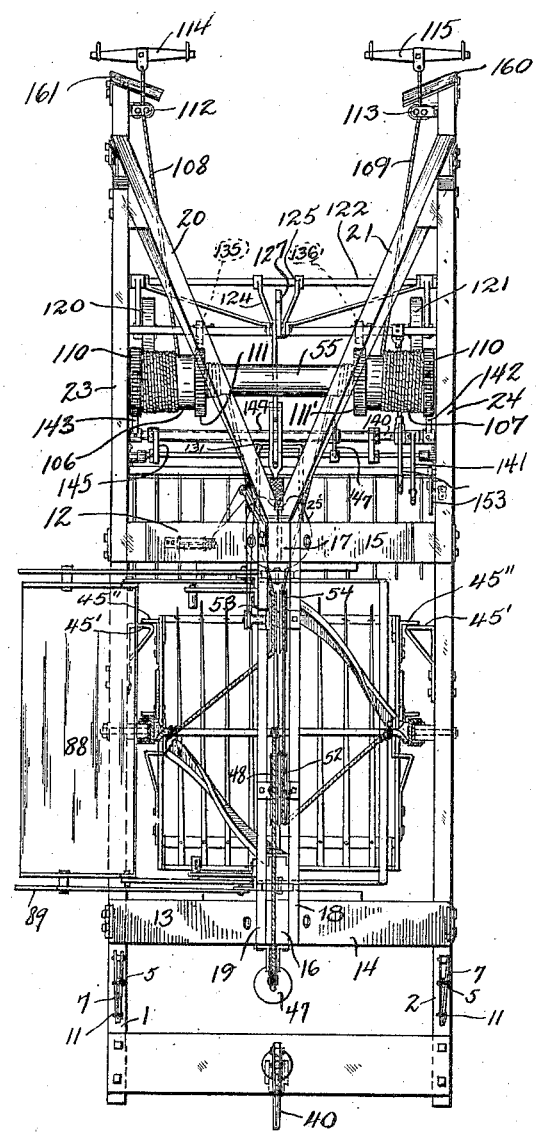

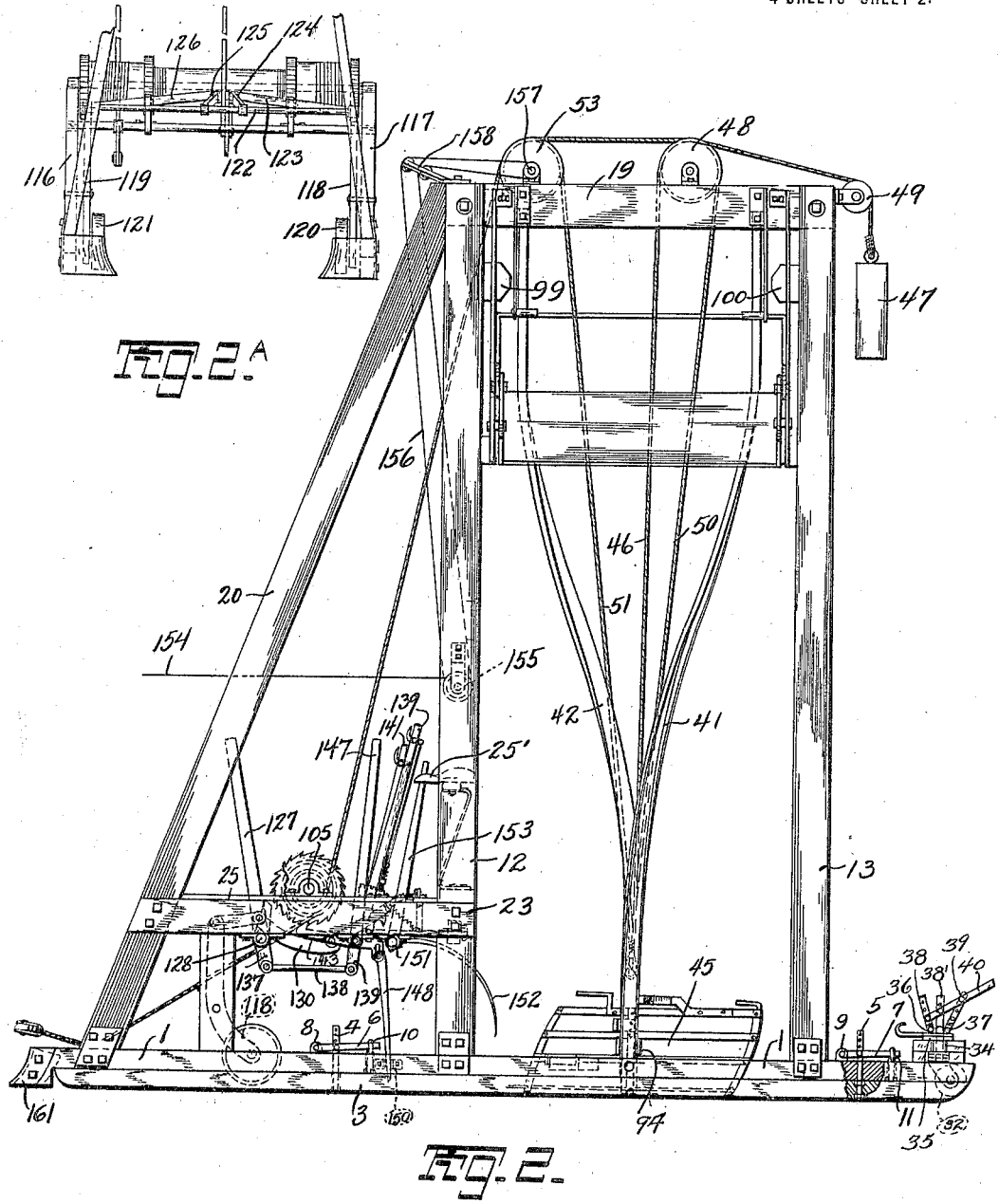

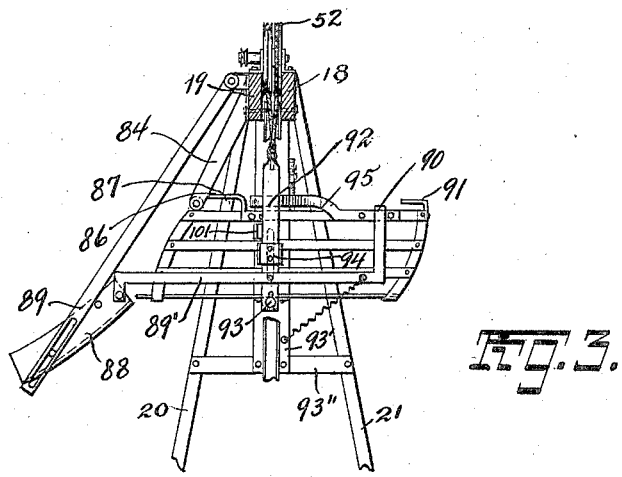
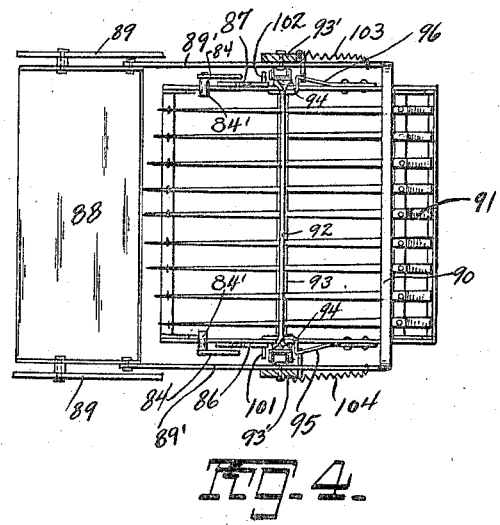

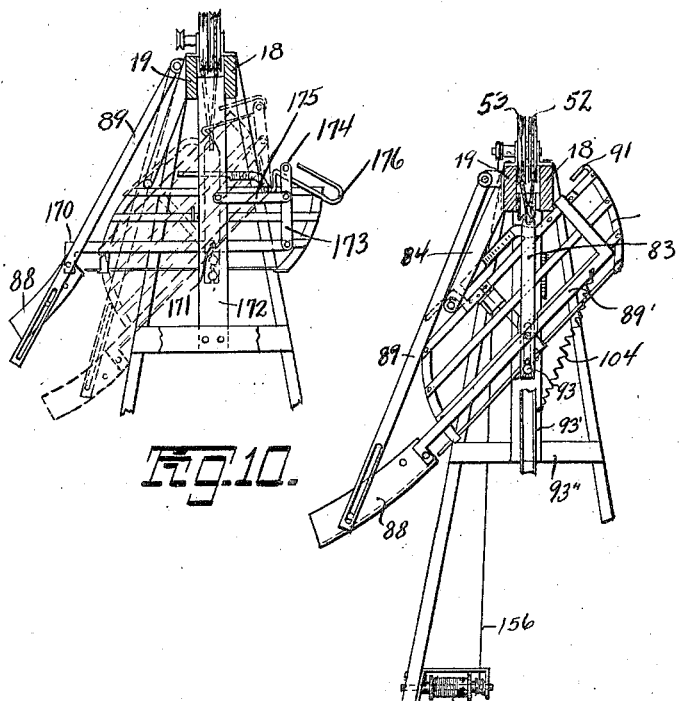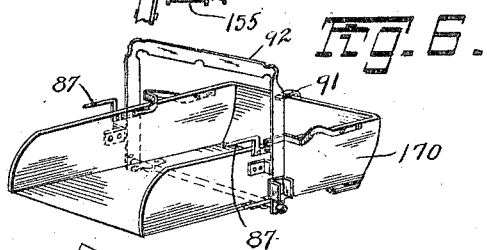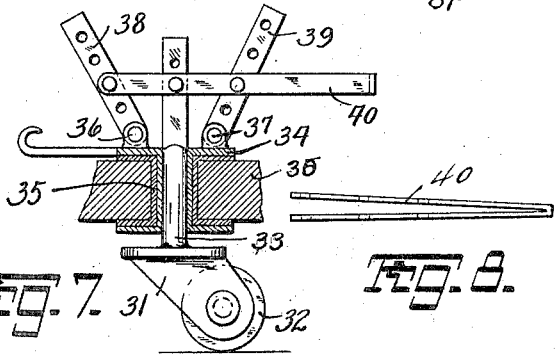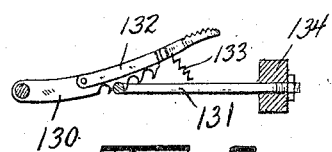

EDWIN B. HAWKINS, OF SAN FRANCISCO, CALIFORNIA.

HOISTING APPARATUS.

1,234,332.  Specification of Letters Patent.  Patented July 24, 1917.

Application filed May 11, 1915, Serial No. 27,344. Renewed January 29, 1917. Serial No. 145,308.

*To all whom it may concern:*

Be it known that I, EDWIN B. HAWKINS, a citizen of the United States, residing at San Francisco, in the county of San Francisco, State of California, have invented a new and useful Hoisting Apparatus, of which the following is a specification, in such full and clear terms as will enable those skilled in the art to construct and use the same.

This invention relates to a side dumping hoist and its object is to produce a hoist which may be used for dumping materials into a wagon or car after the said materials have been picked up from the ground.

The device is illustrated in connection with a hay fork, although it will be clear to those skilled in the art that a dirt skip such as is illustrated in Fig. 11 may be used interchangeably with the fork shown in the other figures.

An object of the invention is to provide an apparatus which may be driven along the ground and either pick up hay or dirt, after which the apparatus is allowed to remain stationary while the horse or horses operating the same lift the charge of material picked up by the fork or skip and dump it into the wagon at the side of the hoist.

Other objects of the invention will appear as the description proceeds.

An embodiment of the invention is shown in the drawing in which the same reference numeral is applied to the same portion throughout, but I am aware that there may be many modifications thereof.

Figure 1 is a plan view of the complete hoist,

Fig. 2 is a side elevation thereof,

Fig. 2^A is a front elevation of the hoist showing the relations of certain of the operating levers, Fig. 3 is a side elevation of the hay hoisting fork in position ready to dump, Fig. 4 is a plan view of the fork shown in Fig. 3, Fig. 5 is a side elevation of the fork in the dumping position, Fig. 6 is a perspective view of a skip used in hoisting dirt, Fig. 7 is a view partly in section of one of the caster wheels used for preventing the hoisting frame from going into the ground too heavily.

Fig. 8 is a plan view of one of the levers used on the caster wheels shown in Fig. 7, Fig. 9 is a side elevation of one of the notched levers used for holding the front wheels down, and Fig. 10 is a side elevation of a slightly modified form of dumping apparatus, the fork being shown in dotted lines in the dumping position.

The hoist comprises a pair of skids 1 and 2, each of which has a subrunner 3, the position of said subrunner being determined by the position of the rods 4 and 5 which pass through the skids 1 and 2 and which may be moved downwardly by means of the levers 6 and 7, said levers being suitably connected with brackets 8 and 9 respectively and held in the position indicated in Fig. 2 by means of links 10 and 11, said subrunners being for the purpose of leveling the frame of the machine where uneven ground is passed over.

Connected with the skids 1 and 2 are four upwardly extending posts 12, 13, 14 and 15, said posts being spaced apart at their upper ends by means of blocks 16 and 17 and connected by means of two horizontal stringers 18 and 19 with the posts extending from the forward ends of the skids. Two braces 20 and 21 extend upwardly to the top of the frame and are suitably secured at their upper ends to the posts 12 and 15 and blocks 16 and 17. Connecting the brace 20 and post 12 is a horizontal stringer 23 and connecting the post 15 and brace 21 is a horizontal stringer 24, similar to the stringer 23.

A suitable floor 25 is mounted on the stringers 23 and 24, although the same is removed for purposes of illustration in Fig. 1, said floor affording space for the operator to move around on, the operator's seat being shown at 25'. At the rear the skids are connected by means of a suitable cross piece 30 at the center of which is mounted the caster frame 31 carrying a caster wheel 32 for steering purposes.

The caster wheel shaft 33 is mounted in a revoluble sleeve 34 which in turn is mounted in a fixed sleeve 35 which forms the bearing for the caster wheel. The top of the sleeve 34 has ears 36 and 37 and with which ears links 38 and 39 are pivotally connected. The caster wheel shank 38′ has a lever 40 pivoted thereto which is bolted to the two links 38 and 39 and which lever may be used for pushing the caster wheel up or down when it is desired to prevent the skids from sinking too deeply into the earth.

Connected with a point midway between the front and back posts are two channel steel guides 41 and 42, said guides having a straight portion at each end and being twisted at their intermediate parts so that the skip or fork will be turned 90 degrees in its ascent from the position shown in Fig. 2 to the position at the top of the hoisting frame.

The skip or fork 45 is counter-balanced by means of the rope 46, weight 47 and pulleys 48, 49, the latter being fixed in a suitable bracket at the end of the stringers 18, 19. Two ropes 50, 51 are connected with opposite sides of the skip and pass over pulleys 52, 53 respectively, the rope 50 passing over an additional pulley 54, from which point the ropes are passed around a winding drum 55 to enable the horse or horses hitched to the cables to raise the load into the skip or fork as the case may be. The fork shown in Fig. 1 is prevented from moving to the rear when being loaded by stop brackets 45′ inside of the skids, oppositely placed L shaped brackets 45″ being placed on the fork to coöperate therewith.

The fork or skip is mounted in a bail 92, said bail being interchangeable with any of the apparatus to be used in this case. The skip is prevented from rising too high by having the arms 84 at each side thereof extending downwardly from the head gear so that at a predetermined point the rollers 84′ will strike the forward end of the fork 85 and depress it for further hoisting, the bail 92 simply raising the skip until all of the material therein falls out. The rollers 84′ above referred to, two in number, are carried by the two fixed arms 84 one at each side of the skip, and they are for the purpose of supporting the skip or fork when it is being dumped. Hooks 86 and 87 pass over the rollers on the arms 84 and compel the fork to dump as it should, while at the same time the chute 88 pivoted and slidable on the link 89 is dropped down the same amount as the front end of the rake. A secondary bail 89′ is used to hold the skip and discharge chute together.

The bail 89′ is pivotally and slidably mounted in a post 93′ extending from the head frame down to a cross bar 93″, there being one of said posts at each end of the head frame.

The bail 89′ is pivotally connected with the discharge chute 88, which latter may be adjustably positioned on the supporting links 89 and the upper end of said discharge chute is pivoted to the ends of the bail 89′, the opposite end thereof passing over the top of the fork as indicated at 90, a hook 91 being provided to prevent accidental dislodgment of the bail from the fork.

At the front end of the fork the hooks 86 and 87 prevent the skip from getting out of alinement and positively assist in raising the discharge end of the fork after the load has been discharged. At the sides of the fork the bail 92 is pivoted, said bail being pivoted to the bottom of the skip on a cross shaft 93 and having guides 94 to enable the skip to move up and down on the guides 41, 42. Springs 95 and 96 hold the skip in the loaded position until it has been released by bringing the springs 95, 96 against two plates 99, 100 at the top of the frame. The skip or fork is prevented from turning backward by means of two lugs 101, 102 just in front of the bail 92. The bail 89′ is assisted in returning to the position shown in Fig. 3 by springs 103, 104 at the sides thereof.

Supported on the stringers 23, 24 at the front of the machine is a drum shaft 105. The shaft 105 carries the winding drum 55 and two larger winding drums 106 and 107 which latter drums have cables 108, 109 wound thereon respectively, said cables being reversely wound with respect to the cables 50, 51 connected with the hoisting apparatus. The shaft 105 is also provided with two ratchet wheels 110 at the ends thereof, two ratchet wheels with reversely placed ratchets being used at 111 and 111′. The cables 108, 109 pass through pulleys 112, 113 respectively to be connected with the swingle trees 114, 115, to which the horses are harnessed. Short posts 116, 117 connect the stringers 23, 24 with the skids below them and they form a support for arms 118, 119 carrying wheels 120, 121 respectively.

The two arms 118, 119 extend upwardly into proximity to the floor 25 and are connected by a bar 122, which bar has reinforcing truss members 123, 124, 125 and 126 pivotally connected with the operating lever 127, said lever being mounted on a shaft 128 supported in journal bearings immediately below and connected with the stringers 23, 24. The lever 127 has a link 130 connected therewith, which link has a plurality of notches for engagement with a staple 131, said link 130 having a lever 132 pivoted thereto to enable the operator to release the link 130 from the staple when necessary. The lever 132 has a spring 133 connected therewith to hold the lever 132 in engagement with the staple 131 until released by the operator. The staple 131 extends through a cross bar 134 connecting the two posts 12 and 15.

Rigidly connected with the shaft 128 are two pawls 135, 136, which pawls engage the ratchet wheels 111. Extending downwardly from the shaft 128 is an arm 137 which arm is rigidly connected to said shaft 128 and is connected with a link 138 connected to the lower end of the lever 139. The lever 139 is loosely mounted on the shaft 140, while rigidly mounted therewith is a lever 141 which turns said shaft to bring the pawls 142, 143 into or out of engagement with the two ratchet wheels 110. Also loosely mounted on the shaft 140 is a tube 144, which tube has short arms 145 rigidly connected thereto and said tube is turned with the lever 147, the object being to push the two spuds 148 down into the ground when a load is to be hoisted, two brackets 150, one on each of the two skids 1, 2 being used to hold the spuds in a fixed position with respect to the frame of the machine.

Just at the rear of the spuds 148, 149 is a cross shaft 150' which shaft carries a plurality of rake teeth 152, which rake teeth are manipulated by the operator by means of the lever 153. In order to enable the operator to handle his team without leaving his seat 25 is a rope 154, said rope passing over a winding drum 155, which drum is rotated by means of a rope belt 156 driven from a small pulley 157 adjacent the pulley 53, suitable pulleys being provided at 158 for changing the direction of motion of the belt 156. As the team travels out the rope 154 will be unwound thereby allowing the lines to pass out while as the skip returns to its original position down the quarter turned guides 4, 42 the lines will be pulled back to the driver and the team will be compelled to back up.

At the front end of the skids removable shares 160, 161 may be provided, said shares being suitable for any particular class of material the user desires to handle; for example, if dirt is to be handled ordinary plow shares might be used, while if other materials are to be handled the form of shares would be changed accordingly.

The operation of the apparatus is as follows: Assuming the team to be connected with the swingle trees the hoisting apparatus is pulled along over the field assuming bunches of hay to be elevated. When a bunch of hay has been picked up by the fork the operator will release the pawls on the ratchet wheels 110 and will engage the pawls on the ratchet wheels 111 and 111', whereupon the spuds 148 may be pressed down into the ground thereby preventing the machine from being pulled forward; at the same time the team will pull on the cables 108, 109 and owing to the different sizes of the drums on which the cables are wound will have a considerable purchase for raising the load. As the load is raised the curved guides 41, 42 turn the fork 90 degrees so that it will dump at the side of the apparatus into a wagon driven along side, the bail 89' compelling the fork to dump when it reaches the top of the frame. After the load is dumped the team may be backed up and the rake teeth 152 may be lowered to gather up any stray particles of hay that may be scattered on the ground as the machine is pulled forward to the next bunch of hay.

While the apparatus just described has been shown in connection with a hay fork, it is clear that a skip 170 shown in Fig. 6 may be equally used in the place of the fork, said skip being interchangeable therewith.

In Fig. 10 there is shown a slightly modified form of bail for the head of the derrick frame. In this figure the numerals designate the same parts as in the previous figures except that the chute 88 is connected with links 170 at opposite ends thereof, said links being pivoted at 171 to posts 172 depending from the head frame. At the opposite end of the links 170 from the chute there are two upwardly extending links 173 one at each side of the skip, said links having a cross bar 174. The link 173 has a link 175 pivoted thereto and pivoted to the post 172, there being one of the links 173 for each of the posts 175. The fork is provided with a long hook at each side thereof for the purpose of locking the fork to the rod 174, the object being to compel the fork to be righted when once dumped.

Having thus described my invention what I claim as new and desire to secure by Letters Patent of the United States, is as follows, modifications within the scope of the claims being expressly reserved:

1. In a hoisting apparatus, a frame, guide ways therein twisted 90 degrees at their upper ends from the position of their lower ends, a load carrier slidably mounted in said guide ways, a side dumping chute at the upper end of the frame, and a pivoted bail to engage the load carrier to hold said carrier and said side dumping chute together when dumping.

2. In a hoisting apparatus, a frame, guide ways therein twisted 90 degrees at their upper ends from the position of their lower ends, a load carrier slidably mounted in said guide ways, means to level said load carrier, a pivoted side dumping chute at the top of the frame, a bail pivotally connected with said chute and with the frame, and adapted to engage the load carrier to hold the load carrier and chute in a given position when the load is being dumped.

3. In a hoisting apparatus, a frame, cables for connecting a team thereto, a winding drum around which said cables pass, guides in the frame, a load carrier slidable on said guides, cables extending from the load carrier to the winding drum and reversely wound with respect to the first mentioned cables, a secondary winding drum, and means whereby said secondary drum is rotated as the load carrier is raised or lowered to unwind or wind up the driving reins of the team.

In testimony whereof I have hereunto set my hand this 3rd day of May, A. D. 1915, in the presence of the two subscribed witnesses.

EDWIN B. HAWKINS.

Witnesses:
CARLOS P. GRIFFIN,
L. H. ANDERSON.

Copies of this patent may be obtained for five cents each, by addressing the "Commissioner of Patents, Washington, D. C."